United States Patent
Chatterjee et al.

(10) Patent No.: US 11,775,174 B1
(45) Date of Patent: Oct. 3, 2023

(54) SYSTEMS AND METHODS OF DATA MIGRATION IN A TIERED STORAGE SYSTEM BASED ON VOLUME PRIORITY CATEGORY

(71) Applicant: Amzetta Technologies, LLC, Norcross, GA (US)

(72) Inventors: Paresh Chatterjee, Fremont, CA (US); Vijayarankan Muthirisavengopal, Chennai (IN); Sharon Samuel Enoch, Dacula, GA (US); Senthilkumar Ramasamy, Duluth, GA (US)

(73) Assignee: Amzetta Technologies, LLC, Norcross, GA (US)

( * ) Notice: Subject to any disclaimer, the term of this patent is extended or adjusted under 35 U.S.C. 154(b) by 51 days.

(21) Appl. No.: 17/068,163

(22) Filed: Oct. 12, 2020

Related U.S. Application Data

(60) Provisional application No. 62/913,780, filed on Oct. 11, 2019.

(51) Int. Cl.
*G06F 3/06* (2006.01)

(52) U.S. Cl.
CPC .......... *G06F 3/0611* (2013.01); *G06F 3/0665* (2013.01); *G06F 3/0685* (2013.01)

(58) Field of Classification Search
CPC .... G06F 3/0611; G06F 3/0665; G06F 3/0685; G06F 3/0649; G06F 3/0647–065
See application file for complete search history.

(56) References Cited

U.S. PATENT DOCUMENTS

| | | |
|---|---|---|
| 6,839,827 B1 | 1/2005 | Beardsley et al. |
| 7,085,879 B2 | 8/2006 | Aasheim et al. |
| 7,536,529 B1 | 5/2009 | Chatterjee et al. |
| 7,603,529 B1 | 10/2009 | Machardy et al. |
| 7,711,897 B1 | 5/2010 | Chatterjee et al. |

(Continued)

OTHER PUBLICATIONS

Chris Evans, Enterprise Computing: Thin Provisioning and the Cookie Monster, Nov. 17, 2009, Storage Architect Blog at wordpress.com, http://thestoragearchitect.wordpress.com/tag/thick-provisioning/ 4 pages.

(Continued)

*Primary Examiner* — Chie Yew
(74) *Attorney, Agent, or Firm* — Meunier Carlin & Curfman LLC

(57) ABSTRACT

Systems, methods, and computer-readable media for handling I/O operations in a storage system are described herein. An example method includes assigning each of a plurality of storage devices to one of a plurality of tiers; imposing a hierarchy on the tiers; creating a logical volume by reserving a portion of a storage capacity for the logical volume without allocating the portion of the storage capacity to the logical volume; and assigning the logical volume to one of a plurality of volume priority categories. The method includes receiving a write I/O operation directed to a logical unit of the logical volume; and allocating physical storage space for the logical unit of the logical volume in response to the write I/O operation. The physical storage space is located in one or more storage devices. The method includes writing data associated with the write I/O operation to the one or more storage devices.

20 Claims, 10 Drawing Sheets

(56) References Cited

U.S. PATENT DOCUMENTS

| | | | |
|---|---|---|---|
| 7,747,835 | B1 | 6/2010 | Chatterjee et al. |
| 8,479,046 | B1 * | 7/2013 | Bailey et al. |
| 9,696,932 | B1 * | 7/2017 | Fradkin ................ G06F 3/0608 |
| 2002/0161983 | A1 | 10/2002 | Milos et al. |
| 2003/0023811 | A1 | 1/2003 | Kim et al. |
| 2006/0253681 | A1 | 11/2006 | Zohar et al. |
| 2007/0156957 | A1 | 7/2007 | Machardy et al. |
| 2010/0023566 | A1 | 1/2010 | Minamino et al. |
| 2010/0191779 | A1 | 7/2010 | Hinrichs |
| 2010/0287408 | A1 | 11/2010 | Kopylovitz |
| 2013/0097387 | A1 * | 4/2013 | Sanchez Martin . G06F 12/0862 |
| | | | 711/E12.042 |
| 2016/0004460 | A1 * | 1/2016 | Sato ..................... G06F 3/0617 |
| | | | 709/219 |
| 2020/0042618 | A1 * | 2/2020 | Mukku ................ G06F 3/0649 |

OTHER PUBLICATIONS

Hitachi Data Systems and Symantec Corporation, Thin Provisioning and Storage Reclamation, Jul. 2010, 18 pages.

* cited by examiner

SYSTEMS AND METHODS OF DATA MIGRATION IN A TIERED STORAGE SYSTEM BASED ON VOLUME PRIORITY CATEGORY

CROSS-REFERENCE TO RELATED APPLICATIONS

This application claims the benefit of U.S. provisional patent application No. 62/913,780, filed on Oct. 11, 2019, and entitled "SYSTEMS AND METHODS FOR IMPROVED PROVISIONING IN A TIERED STORAGE SYSTEM," the disclosure of which is expressly incorporated herein by reference in its entirety.

BACKGROUND

Fat provisioning is a type of storage provisioning where space is allocated beyond current needs in anticipation of the growing need and increased data complexity. For example, storage space on one or more volumes or disks is allocated for the specific use of one or more users or applications. This storage space once allocated for the specific use may not be used by any other users or applications until the space is deallocated.

As may be appreciated, fat provisioning as described above has many disadvantages over more recent data allocation techniques such as thin provisioning. One such disadvantage is low capacity utilization. For example, once a user or application has been allotted storage capacity, no other users or applications may use the allotted space. Thus, if the user or application does not use all of the allotted space, then the excess space is essentially wasted. In systems with a large number of users, the amount of wasted capacity may outweigh the amount of disk capacity that is actually used.

Other disadvantages associated with fat provisioning include increased seek times and degradation of performance. For example, when the storage capacity of a logical volume is initially allocated to one or more users or applications, the allocated regions are spread across the logical volume and all data writes fall into place. Accordingly, random input/output ("I/O") operations that initially land on the logical volume are scattered across the logical drive. This leads to increased seek times when data is accessed in different regions of the logical volume and degraded performance. The disadvantages above are amplified in a tiered storage system that includes a plurality of storage devices.

SUMMARY

An example computer-implemented method for handling input/output ("I/O") operations in a tiered storage system is described herein. The method can include assigning each of a plurality of storage devices to one of a plurality of tiers; imposing a hierarchy on the tiers; creating a logical volume by reserving a portion of a storage capacity of the tiered storage system for the logical volume without allocating the portion of the storage capacity of the tiered storage system to the logical volume; and assigning the logical volume to one of a plurality of volume priority categories. The method can also include receiving a write I/O operation directed to a logical unit of the logical volume; and allocating physical storage space for the logical unit of the logical volume in response to the write I/O operation. The physical storage space can be located in one or more storage devices. The method can further include writing data associated with the write I/O operation to the one or more storage devices.

Additionally, the method can further include defining the plurality of volume priority categories, where each respective volume priority category is associated with a respective data distribution across the tiered storage system.

Alternatively or additionally, the method can further include sequentially writing data associated with a plurality of write I/O operations to the one or more storage devices.

Additionally, the method can further include allocating physical storage space for a plurality of logical units of the logical volume in response to the write I/O operations. The physical storage space can be located in the one or more storage devices.

Alternatively or additionally, the method can include migrating data in the logical volume between a storage device assigned to a relatively higher tier and a storage device assigned to a relatively lower tier based on a frequency of data access or a time of last data access.

Alternatively or additionally, the method can include creating a system table including a plurality of entries; and creating a volume table for the logical volume, the volume table including a plurality of entries. Each of the entries in the system table can be mapped to a unique portion of the storage capacity of the tiered storage system. Additionally, each of the entries in the volume table can contain a pointer to an entry in the system table, a pointer directed to physical storage space, or a null value. Optionally, the method can include examining the volume table to determine whether the logical unit of the logical volume has been allocated. Optionally, the method can include examining the system table to determine whether reserved storage capacity for the logical volume remains unallocated.

Alternatively or additionally, the storage devices can include at least one solid-state drive ("SSD"), serial attached small computer system interface ("SAS") drive, or serial AT attachment ("SATA") drive. Additionally, the hierarchy can be imposed on the tiers based, at least in part, on the types of drives.

Alternatively or additionally, one or more of the storage devices can have different performance characteristics. Additionally, the hierarchy can be imposed on the tiers based, at least in part, on the different performance characteristics.

An example non-transitory computer-readable recording medium is described herein. The non-transitory computer-readable medium can have computer-executable instructions stored thereon that, when executed by a computer in a tiered storage system, cause the computer to: assign each of a plurality of storage devices to one of a plurality of tiers; impose a hierarchy on the tiers; create a logical volume by reserving a portion of a storage capacity of the tiered storage system for the logical volume without allocating the portion of the storage capacity of the tiered storage system to the logical volume; assign the logical volume to one of a plurality of volume priority categories; receive a write input/output ("I/O") operation directed to a logical unit of the logical volume; and allocate physical storage space for the logical unit of the logical volume in response to the write I/O operation. The physical storage space can be located in one or more storage devices. Additionally, the non-transitory computer-readable recording medium can have further computer-executable instructions stored thereon that, when executed by the computer in the tiered storage system, cause the computer to write data associated with the write I/O operation to the one or more storage devices.

An example storage system computer for handling input/output ("I/O") operations in a tiered storage system is also described herein. The storage system computer can include a processor and a memory operably connected to the processor, where the memory can have computer-executable instructions stored thereon that, when executed by the processor, cause the processor to: assign each of a plurality of storage devices to one of a plurality of tiers; impose a hierarchy on the tiers; create a logical volume by reserving a portion of a storage capacity of the tiered storage system for the logical volume without allocating the portion of the storage capacity of the tiered storage system to the logical volume; assign the logical volume to one of a plurality of volume priority categories; receive a write I/O operation directed to a logical unit of the logical volume; and allocate physical storage space for the logical unit of the logical volume in response to the write I/O operation. The physical storage space can be located in one or more storage devices tier. Additionally, the memory can have further computer-executable instructions stored thereon that, when executed by the storage system computer, cause the storage system computer to write data associated with the write I/O operation to the one or more storage devices.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for handling I/O operations in a tiered storage system, it will become evident to those skilled in the art that the implementations are not limited thereto.

Figure 1:
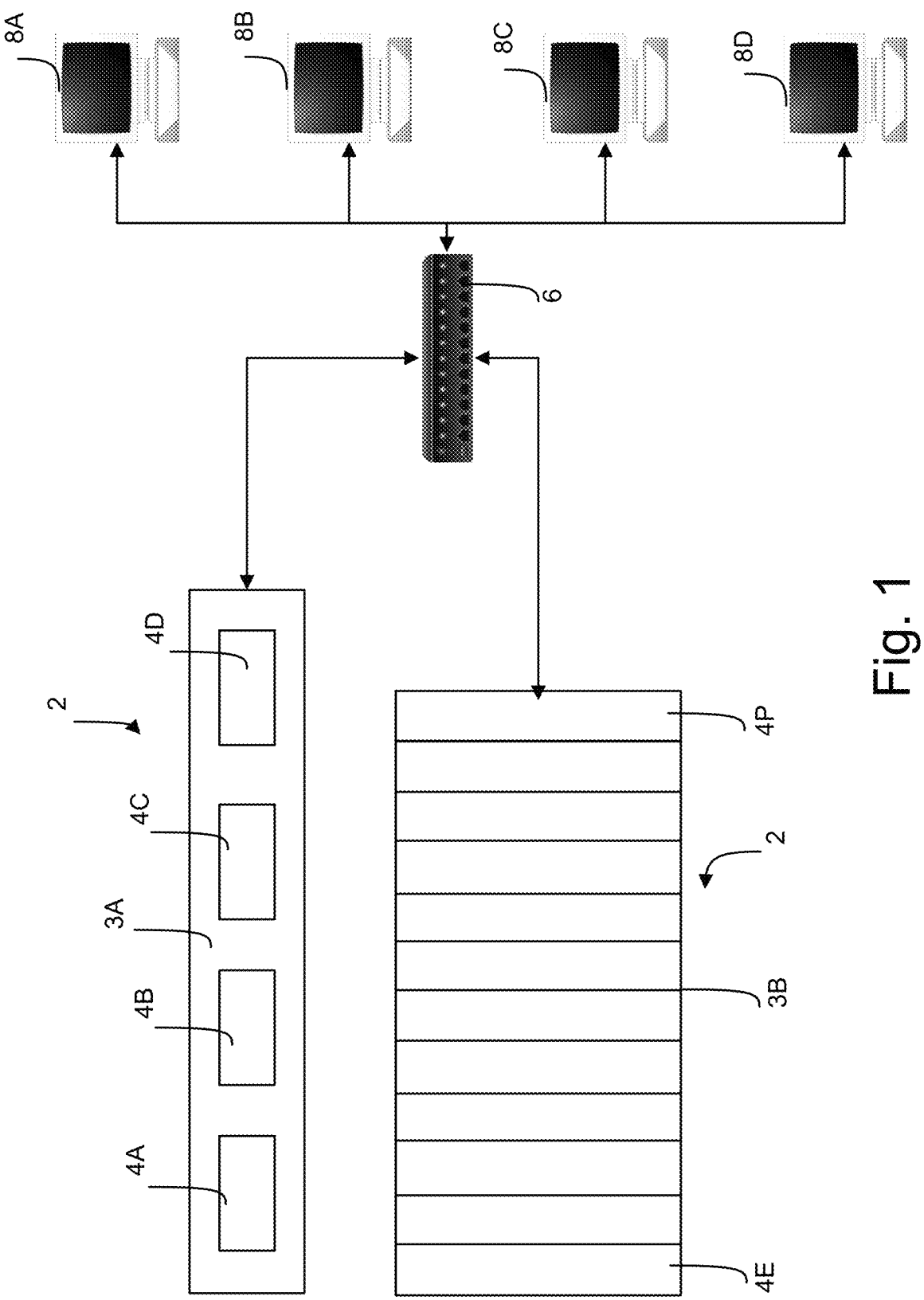
FIG. 1 illustrates an example operating environment for the various embodiments described herein.
Figure 2:
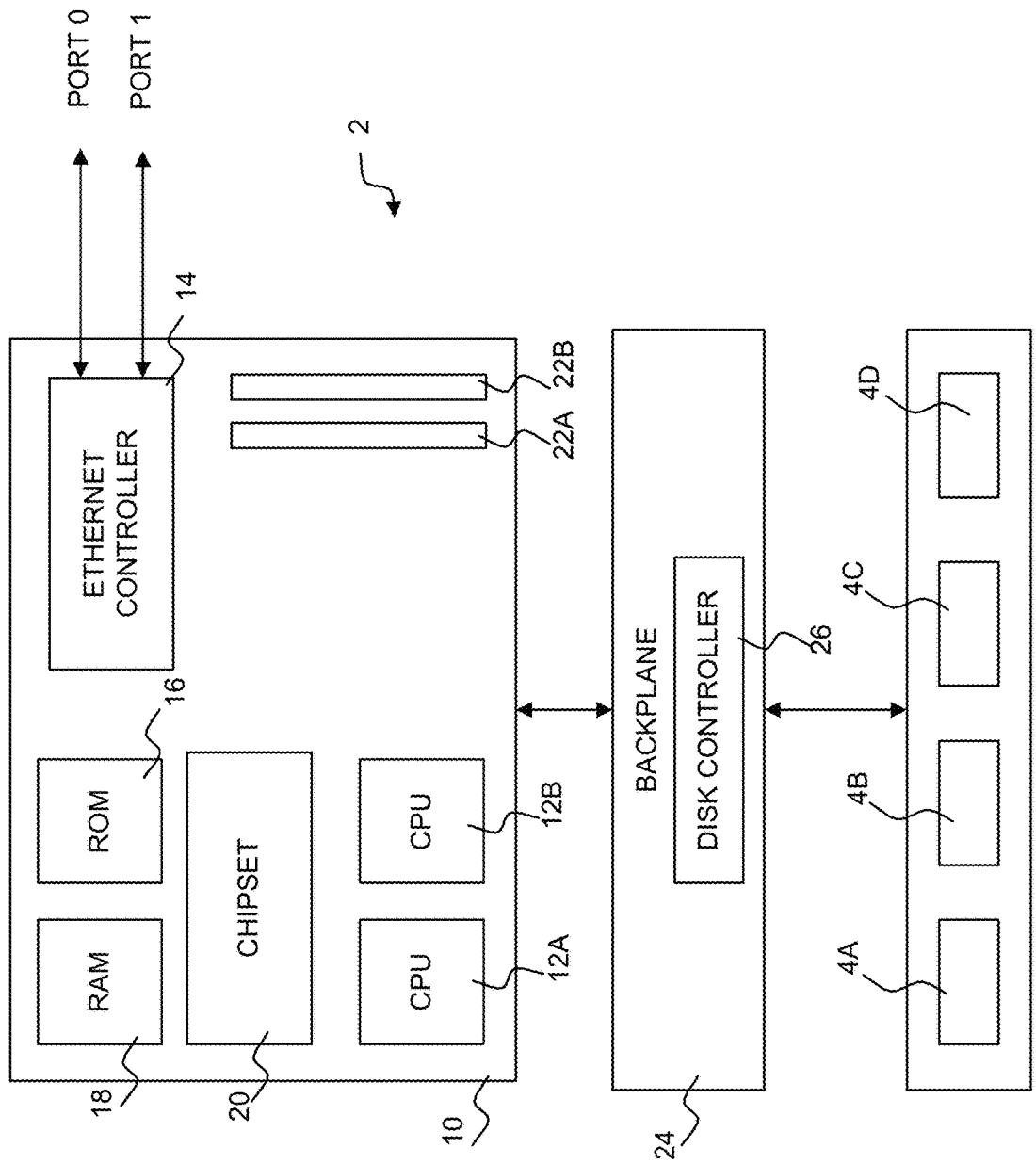
FIG. 2 illustrates an example computer hardware architecture for practicing the various embodiments described herein.
Figure 3:
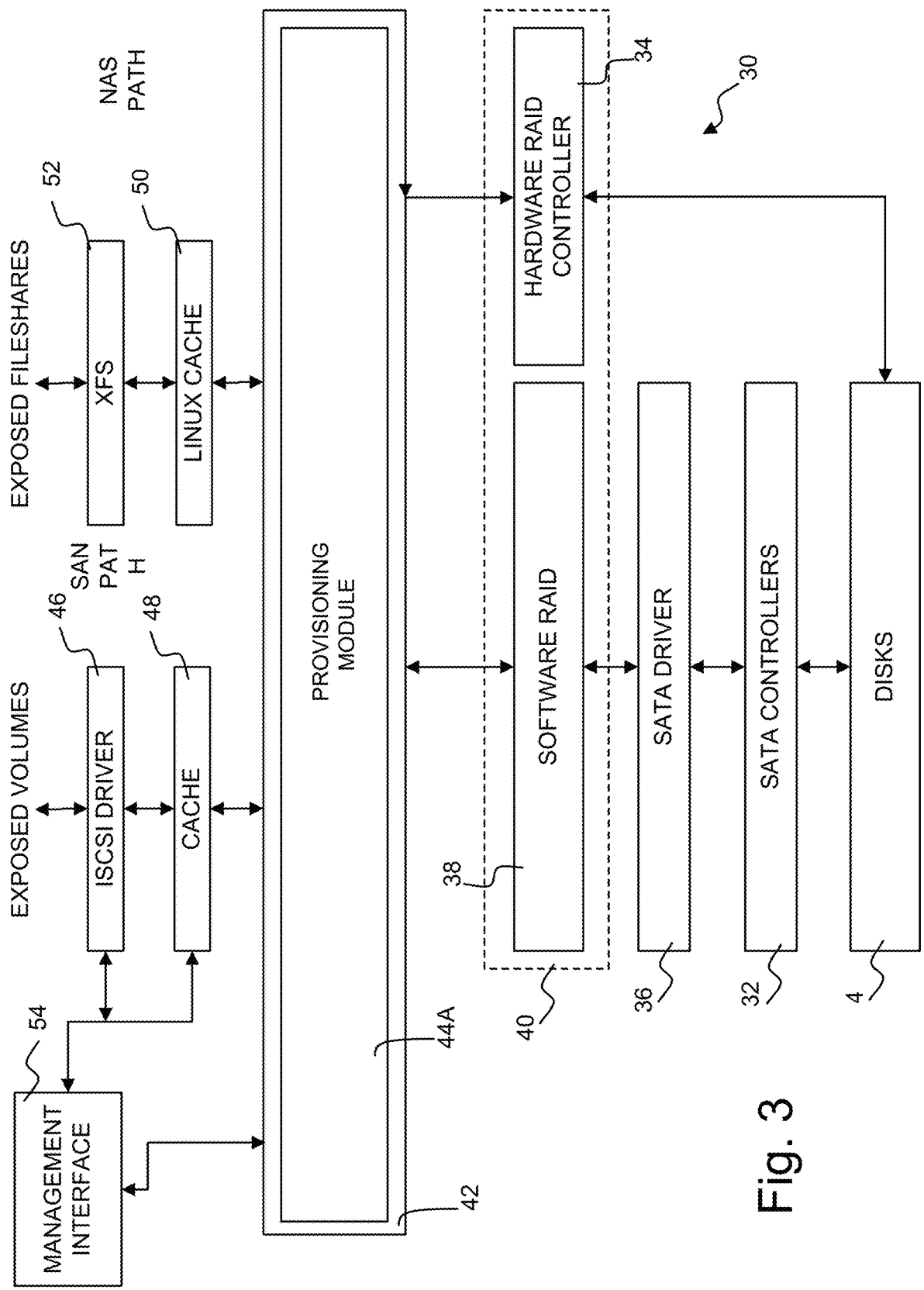
FIG. 3 illustrates an example computer software architecture for practicing the various embodiments described herein.

FIGS. 1-3 and the following discussion are intended to provide a brief, general description of a suitable computing environment in which the techniques described herein may be implemented. Generally, program modules include routines, programs, components, data structures, and other types of structures that perform particular tasks or implement particular abstract data types. Moreover, those skilled in the art will appreciate that the techniques described herein may be practiced with other computer system configurations, including hand-held devices, multiprocessor systems, microprocessor-based or programmable consumer electronics, minicomputers, mainframe computers, and the like. The techniques described herein may also be practiced in distributed computing environments where tasks are performed by remote processing devices that are linked through a communications network. In a distributed computing environment, program modules may be located in both local and remote memory storage devices. While the techniques described herein will be described in the general context of program modules that execute in conjunction with an operating system on a computer system, those skilled in the art will recognize that the techniques described herein may also be implemented in combination with other program modules.

Referring now to FIG. 1, an illustrative operating environment for the various embodiments will be described. As shown in FIG. 1, the embodiments described herein may be implemented in a storage server computer 2 that is operative to receive and respond to requests to read and write data (e.g., handle I/O operations) to a mass storage device, such as a solid state drive ("SSD") or a hard disk drive ("HDD"). As described herein, the mass storage device can be part of a tiered storage system. According to aspects of this disclosure, the storage server computer 2 may be housed in a one rack space unit 3A storing up to four hard disk drives 4A-4D. Alternatively, the storage server computer may be housed in a three rack space unit 3B storing up to fifteen hard disk drives 4E-4P. Other types of enclosures may also be utilized that store fewer or more hard disk drives. In this regard, it should be appreciated that the type of storage enclosure and number of hard disk drives utilized is not generally significant to the implementation of the aspects of this disclosure. Any type of storage enclosure and virtually any number of hard disk devices or other types of mass storage devices may be utilized without departing from the spirit and scope of this disclosure.

According to aspects of this disclosure, the storage server computer 2 includes one or more network ports operatively connected to a network switch 6 using appropriate network cabling. It should be appreciated that, according to aspects of this disclosure, Ethernet or Gigabit Ethernet may be utilized. However, it should also be appreciated that other types of suitable physical connections may be utilized to form a network of which the storage server computer 2 is a part.

The network switch 6 is connected to one or more client computers 8A-8D (also referred to herein as "initiators"). It should be appreciated that other types of networking topologies may be utilized to interconnect the clients and the storage server. It should also be appreciated that the initiators 8A-8D may be connected to the same local area network ("LAN") as the storage server computer 2 or may be connected to the storage server computer 2 via a distributed wide area network, such as the Internet. An appropriate protocol, such as the Internet Small Computer Systems Interface ("iSCSI") protocol, the Serial Attached SCSI ("SAS") protocol, or the nonvolatile memory express ("NVMe") protocol may be utilized to enable the initiators 8A-8D to communicate with and utilize the various functions of the storage server computer 2 over a wide area network such as the Internet. iSCSI, SAS, and NVMe protocols are known in the art and are therefore not described in further detail herein.

According to the various aspects of this disclosure, the storage server computer 2 is operative to receive and respond to requests from the initiators 8A-8D to read or write data on the hard disk drives 4A-4P. As described in greater detail herein, the storage server computer 2 is operative to provide advanced features for data storage and retrieval to the clients. In particular, the storage server computer 2 can allocate physical storage space to a logical volume on demand in response to write I/O operations. The storage server computer 2 may also provide redundant array of inexpensive disks ("RAID") functionality for the hard disk drives 4A-4P. Further, the storage server computer 2 may allow the hard disk drives 4A-4P to be partitioned into logical volumes for access by the initiators 8A-8D. Additional advanced features described herein may also be provided by the storage server computer 2.

According to implementations described herein, the storage server computer 2 receives and responds to requests to read or write data to a tiered storage system. For example, the tiered storage system includes a plurality of storage devices (e.g., hard disk drives 4A-4P of FIG. 1), and the storage server computer 2 assigns each of the storage devices to one of a plurality of tiers. The storage server computer also imposes a hierarchy on the tiers. Storage devices having better performance characteristics reside in relatively higher tiers, while storage devices having worse performance characteristics reside in relatively lower tiers.

In some implementations, the hierarchy can be imposed on the tiers based, at least in part, on the types of drives. As one example, the tiered storage system can include three tiers, where the top tier (e.g., high-performance tier) includes one or more SSDs, the middle tier includes one or more SAS drives, and the bottom tier (e.g., low-performance tier) includes one or more SATA drives. This disclosure contemplates that the SSDs can optionally include one or more NVMe SSDs. This disclosure also contemplates that that the SAS drives can have different rotational speeds such as 7,000 RPM (sometimes referred to as nearline ("NL") SAS), 10,000 RPM, or 15,000 RPM. It should be understood that the tiered storage system can include different numbers of tiers, different numbers of drives, and/or different types of drives than those provided in the example above. Alternatively or additionally, the hierarchy can be imposed on the tiers based, at least in part, on the different performance characteristics of the storage devices. Performance characteristics can include, but are not limited to, rotations per minute ("RPM"), cost, RAID configuration, speed, number of spares, and/or logical drive state. This disclosure contemplates that a storage device's performance characteristics can be considered as a factor when assigning the storage device to a tier.

Turning now to FIG. 2, an illustrative computer hardware architecture for practicing the various aspects of this disclosure will now be described. In particular, FIG. 2 shows an illustrative computer architecture and implementation for the storage server computer 2. In particular, the storage server computer 2 includes a baseboard 10, or "motherboard", which is a printed circuit board to which a multitude of components or devices may be connected by way of a system bus or other electrical communication path. In one illustrative embodiment, these components include, without limitation, one or more central processing units ("CPU") 12A-12B, a network adapter, such as the Ethernet controller 14, a system memory, including a Read Only Memory 16 ("ROM") and a Random Access Memory 18 ("RAM"), and other hardware for performing input and output, such as a video display adapter or a universal serial bus port ("USB"), not all of which are illustrated in FIG. 2.

The motherboard 10 may also utilize a system board chipset 20 implementing one or more of the devices described herein. One or more hardware slots 22A-22B may also be provided for expandability, including the addition of a hardware RAID controller to the storage server computer 2. It should also be appreciated that, although not illustrated in FIG. 2, a RAID controller may also be embedded on the motherboard 10 or implemented in software by the storage server computer 2. A SAS controller may also be embedded in the motherboard 10. It is also contemplated that the storage server computer 2 may include other components that are not explicitly shown in FIG. 2 or may include fewer components than illustrated in FIG. 2.

As described briefly above, the motherboard 10 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 18 and a ROM 16. The ROM 16 may store a basic input/output system or Extensible Firmware Interface ("EFI") compatible firmware that includes program code containing the basic routines that help to transfer information between elements within the storage server computer 2. As also described briefly above, the Ethernet controller 14 may be capable of connecting the local storage server computer 2 to the initiators 8A-8D via a network. Connections which may be made by the network adapter may include local area network LAN or WAN connections. LAN and WAN networking environments are commonplace in offices, enterprise-wide computer networks, intranets, and the Internet. The CPUs 12A-12B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 10 is connected via a backplane 24 and disk controller 26 to one or more mass storage devices. The mass storage devices may comprise SSDs, hard disk drives 4A-4D, or other types of high capacity high speed storage. The mass storage devices may store an operating system suitable for controlling the operation of the storage server computer 2, such as the LINUX operating system. The hard disk drives may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Turning now to FIG. 3, an illustrative computer software architecture for practicing the various aspects of this disclosure will now be described. In particular, FIG. 3 illustrates a storage stack 30 utilized in the aspects of this disclosure. At the top of the storage stack 30, storage volumes or fileshares are exposed to the initiators 8A-8D. At the bottom of the storage stack 30 are the actual mass storage devices, such as the SSDs and/or disks 4A-4D, that are utilized to store the data. As described herein, the mass storage devices can be part of a tiered storage system. The mass storage devices are, in turn, connected to a disk controller, such as a Serial ATA ("SATA") controller 32 or a hardware RAID controller 34. In the case of a SATA controller, a SATA driver 36 may be utilized to access the hardware device. Although a SATA controller 32 and SATA driver 34 are shown in FIG. 2, this disclosure contemplates that the storage stack 30 can include controllers and/or drivers for other types of disks or drives including, but not limited to, NVMe SSDs, SSDs, and SAS drives. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a kernel module 42 that implements the functions described herein. In particular, the kernel module 42 may provide functionality for implementing provisioning, virtualization, snapshots, locking, replication, and capacity expansion. In particular, the provisioning module 44A provides the functionality described herein for allocating physical capacity to logical volumes on an as-needed basis (i.e., on demand in response to write I/O operations). In particular, the provisioning module 44a allows users to reserve physical capacity in the tiered storage system for one or more logical volumes. However, this physical capacity is not actually allocated to the one or more logical volumes until it is needed. Thus, to users or administrators of the system each logical volume appears as to have a fixed size as in fat provisioning; however, by allocating the physical capacity as it is needed, many of the drawbacks associated with fat provisioning such as underutilization and fragmentation may be avoided. Additional details regarding the operation of the provisioning module 44A are provided below with respect to FIGS. 4-6.

Above the kernel module 42, a number of software components are utilized depending upon the access mechanism utilized to access the data stored on the hard disk drives 4. In particular, a Storage Area Network ("SAN") path is provided that utilizes a cache 48 and an Internet Small Computer Systems Interface ("iSCSI") driver 46. A Network Attached Storage ("NAS") path is also provided that utilizes a LINUX cache 50 and the XFS high-performance journaling file system 52. Volumes are exposed through the SAN path while fileshares are exposed through the NAS path.

It should be appreciated that the device drivers of kernel module 42 comprises a LINUX-compatible mass storage device driver in aspects of this disclosure. However, although the aspects of this disclosure are described as being implemented within a LINUX-compatible device driver, the various aspects of this disclosure may be implemented at different points within the storage stack and in conjunction with other operating systems. For instance, aspects of this disclosure may be implemented with the FREEBSD operating system or with the WINDOWS family of operating systems from MICROSOFT CORPORATION of Redmond, Wash. Aspects of this disclosure may also be implemented on a multitude of processor families, including the Intel x86 family of processors, the Intel XScale family of processors, or the IBM PowerPC family of processors.

In some implementations, a management interface 54 may also be provided for controlling and monitoring the various aspects of this disclosure. The management interface communicates with the various layers through software interfaces to retrieve performance data, provide configuration data, and to perform other functions.

Figure 4:
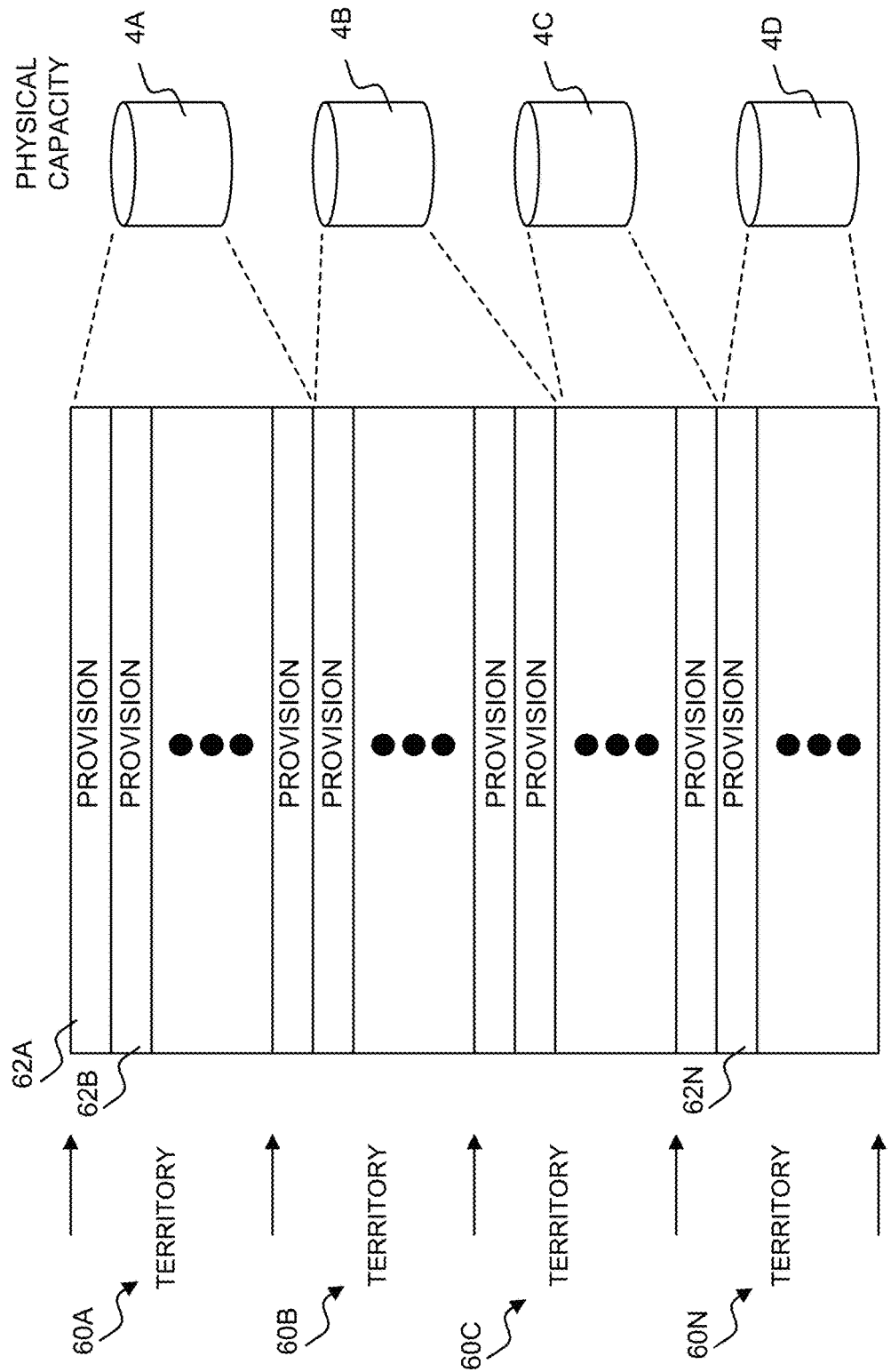
FIG. 4 illustrates an example division of the physical capacity of a storage system into provisions and territories.

Referring now to FIG. 4, additional details regarding the division of the physical capacity of the computer 2 into provisions 62A-62N and territories 60A-60N will be provided. As shown in FIG. 4, the available physical capacity of the computer 2 is made up of a number of hard disk drives 4A-4D. It should be understood that the physical capacity of the computer can optionally include one or more SSDs or other type of high capacity high speed storage device. The hard disk drives 4A-4D can be part of a tiered storage system as described herein. It should be appreciated that other computer nodes connected to the computer 2 may also contribute physical capacity to the available physical capacity of the computer 2. As also shown in FIG. 4, the available physical capacity is divided into a number of unique, equally sized areas, called territories 60A-60N. As will be described in greater detail herein, physical space is reserved for one or more logical volumes as in fat provisioning, but unlike fat provisioning, only allocated to the logical volumes when new write operations are received. Additionally, the physical storage space can be allocated to a logical volume from one or more of the hard disk drives 4A-4D. The physical space may be allocated to the logical volumes in territories, or alternatively provisions. In some implementations, size of a territory may be one gigabyte ("GB"). In other implementations, the size of a territory may be approximately 8 megabytes ("MB"). Alternatively, it should be understood that a territory can optionally have a size more or less than 1 GB or 8 MB.

As also shown in FIG. 4, the available physical capacity is further subdivided into units referred to herein as provisions 62A-62N. The provisions 62A-62N comprise unique, equally sized areas of the available physical capacity and are smaller in size than the territories 60A-60N. In some implementations, the provisions 62A-62N are one megabyte ("MB") in size. Accordingly, each 1 GB territory includes one thousand and twenty-four provisions. In other implementations, the size of a provision may be approximately 512 kilobytes ("KB"). Alternatively, it should be understood that a provision can optionally have a size more or less than 1 MB or 512 KB. It should be appreciated that provisions of other sizes may also be utilized, and multiple provision and territory granularities may co-exist in the same server.

Figure 5:
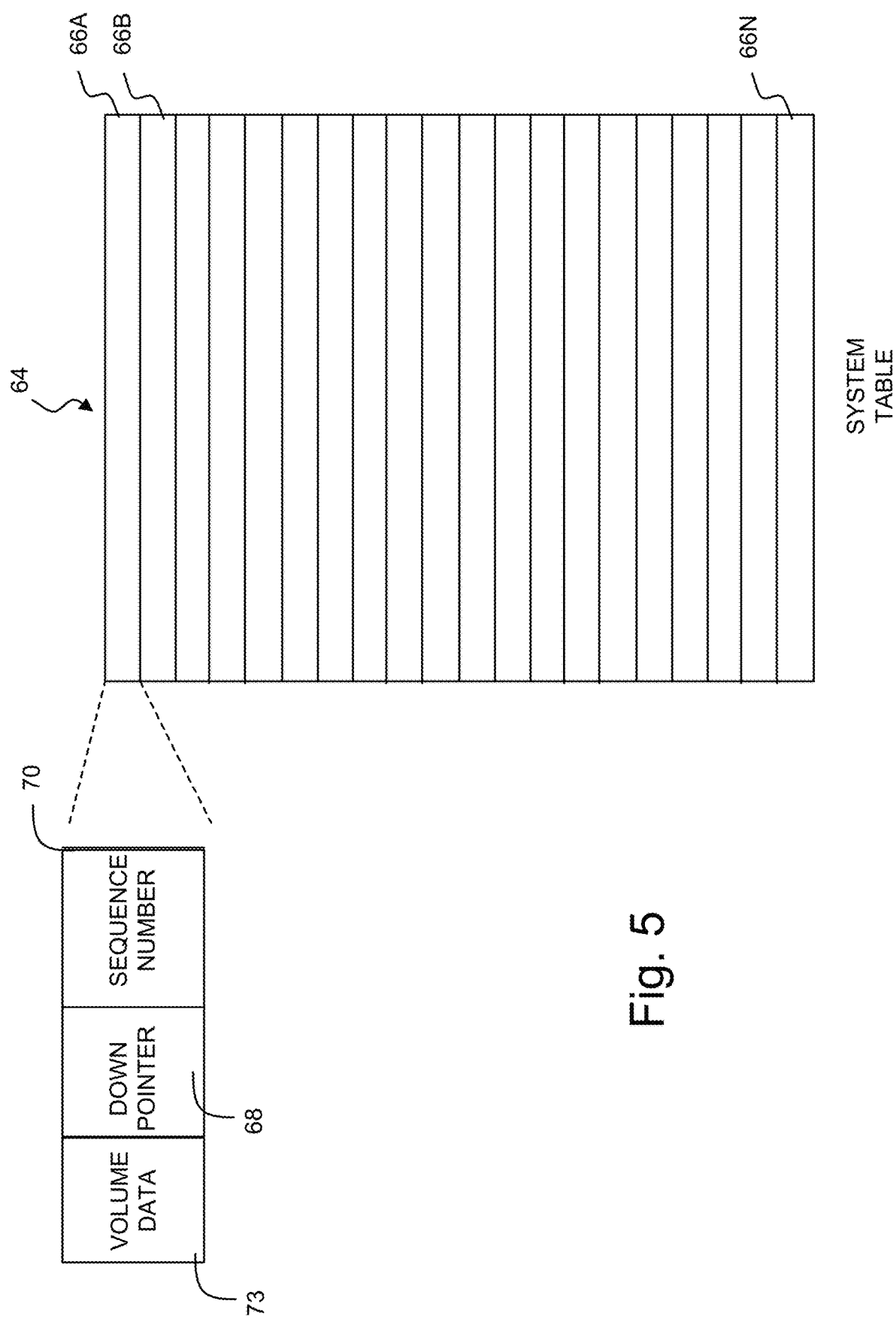
FIG. 5 illustrates an example system table for the various embodiments described herein.

Turning now to FIG. 5, additional details regarding the structure and use of a system table data structure provided by aspects of this disclosure will be described. In particular, FIG. 5 illustrates a system table 64. The system table 64 includes a number of entries 66A-66N, each of which may be mapped to a unique portion of the available physical storage of the computer 2 (e.g., a provision). If additional physical storage is made available to the computer 2, then additional entries may be added to the system table 64 that correspond to portions of the newly added storage. According to aspects of this disclosure, each of the entries 66A-66N in the system table 64 corresponds to a provision within the available physical storage space of the computer 2.

As also shown in FIG. 5, each entry 66A-66N in the system table 64 contains a number of data fields that implement a variety of advanced storage features. For example, each entry may include a down pointer field 68, and a sequence number field 70. The down pointer field 68 may be utilized to store a pointer to another entry in the system table 64 that identifies the next physical provision belonging to the same logical volume and with the same logical provision number.

In some implementations, the system table 64 may further include volume data 73. The volume data 73 may include a record of the amount of physical storage space (e.g., provisions or territories) that have been reserved for each logical volume, and a record of the amount of physical storage space that has actually been allocated to each volume. As will be described further below, when a user or administrator creates a logical volume of a selected size, an entry in the volume data 73 may be made for the volume that indicates the selected size. Later, as data is written to the volume, and physical storage space is allocated to the logical volume, the record of the amount of space that has been allocated to the logical volume thus far can be compared with the selected size of the volume to ensure that space greater than the reserved space is not allocated to the volume. In addition, the volume data 73 may be used to ensure that no more space is reserved for each volume than exists physical storage space on the disks 4A-4D. Accordingly, it is possible to avoid the scenario where a write I/O operation fails, which is possible in conventional systems. According to the techniques described herein, a write I/O operation cannot fail as storage space and tables (e.g., system and volume tables) are already reserved from the underlying physical storage. The pointers to the actual location in physical storage need only be assigned when the write I/O operation is received.

Figure 6:
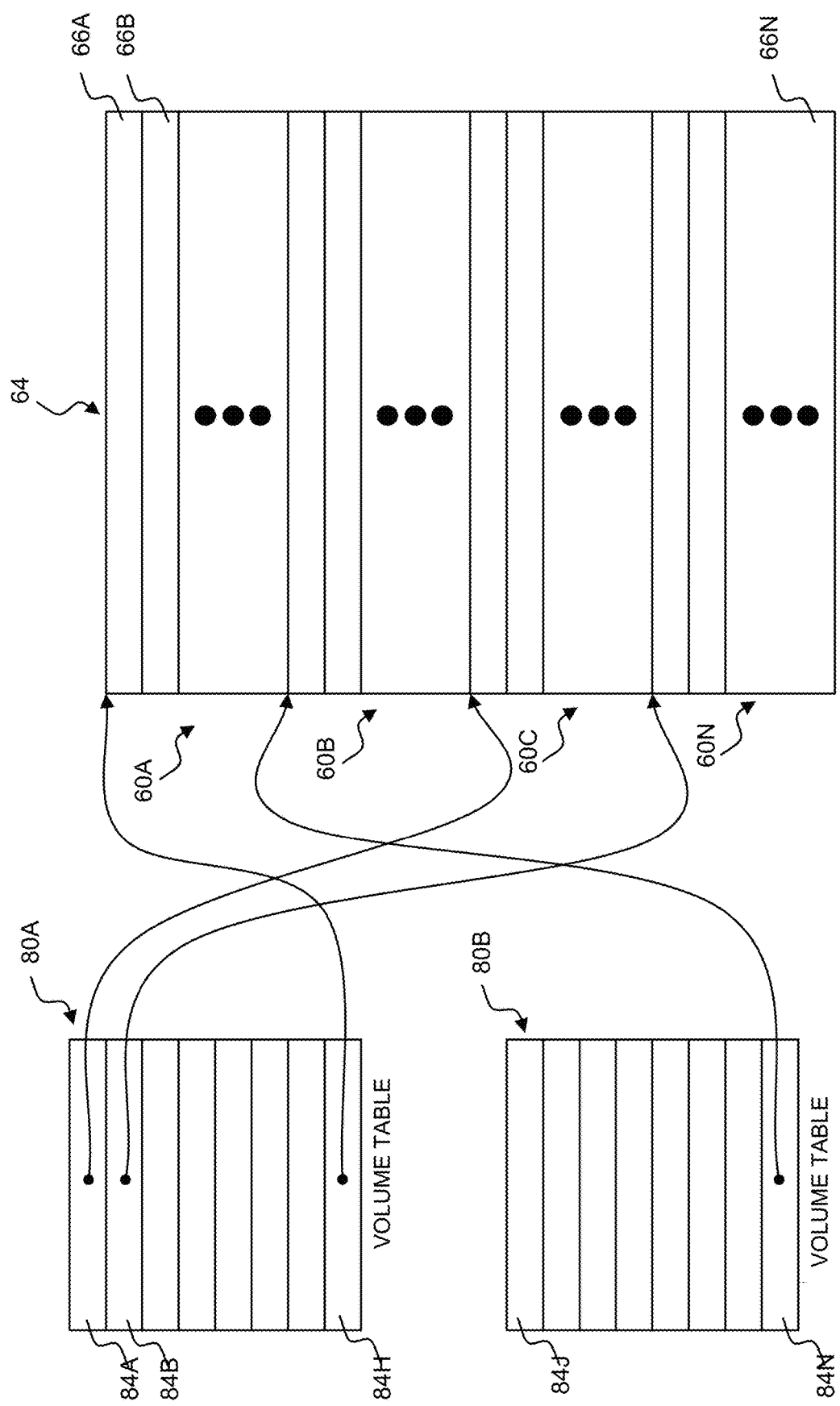
FIG. 6 illustrates example volume tables and an example system table for the various embodiments described herein.

The system table 64 is maintained by the computer 2 and stored in the RAM 18 of the computer 2 for fast access. Referring now to FIG. 6, additional details regarding the system table and a volume table data structure provided by and utilized by aspects of this disclosure will be described. As shown in FIG. 6, a volume table 80A-80B is utilized for each logical storage volume defined in the computer 2. The volume tables 80A-80B include entries 84A-84H and 84J-84N, respectively, for each territory in a logical volume. For instance, the entry 84A corresponds to the first territory in the volume corresponding to the volume table 80A. Other entries in the volume table correspond to other portions of the logical volume. Alternatively, the volume tables 80A-80B may include entries that identify each provision in the logical volumes corresponding to the tables.

Each entry in a volume table 80A-80B can be utilized to store a pointer to a territory in the system table 64, or alternatively a pointer to a provision of the available physical storage space. When a logical volume of a specified size is created by a user or administrator, a volume table 80A-80B is initially created. The volume table 80A-80B may include a number of entries proportional to the size of the logical volume. For example, if the logical volume includes 10 territories, the volume table may include ten entries.

Further, when the volume table 80A-80B is initially created by a user or administrator each entry may be set to a null value or some other value that may indicate that that territory or provision associated with the entry in the volume table 80A-80B has not yet been allocated to the logical storage volume associated with the volume table 80A-80B. At a later time, when a write request (e.g., a write I/O operation) is received for one of the volumes, storage space is allocated to the volume, and a pointer is created to the allocated storage space. As described herein, in some implementations, the storage space allocated to the logical volume is optionally located in a storage device assigned to the highest available tier. In this way, the new data, which is currently frequency used and/or frequency accessed, lands in the highest tier. For instance, a first write request may be received that is directed to the territory referenced by the entry 84H of the volume table 80A. In response to the request, physical space is allocated to the volume by creating a pointer in the entry 84H to the next available territory, the territory 60A, in the system table 64. If a second write request is received directed to the territory referenced by the entry 84N in the volume table 80B, space is allocated by creating a pointer in the entry 84N to the next available territory 60B. A third write operation directed to a portion of the volume corresponding to the entry 84A will cause a pointer to be created to the territory 60C. Similarly, a fourth write operation that is directed to a portion of the volume corresponding to the entry 84B will cause a pointer to be created to the territory 60N referenced by the system table 64. In this manner, physical space is allocated for logical territories within volumes on an as needed basis.

It should be appreciated that there is no requirement that territories and/or provisions must necessarily be of the same size. For example, sparse writes may be stored together in one territory with entries in the system table to distinguish them. It is also possible to adaptively allocate territories of different sizes to different kinds of I/O loads.

Depending on the implementations, when read operations are received, it may be necessary to utilize both the volume table for the corresponding logical volume and the system table to perform the read operation. In particular, where the entries in the volume table point to territories, when a read operation is received for a logical volume, the volume table is examined to determine the location within the system table that refers to the territory where the requested data is stored. From the system table, the start of the physical location containing the requested territory can be determined. The offset within the particular territory can then be utilized to locate the actual data.

In implementations where the entries in the volume tables point to provisions of the disks 4A-4D, it may not be necessary to reference the system table when reading data from a logical volume. When a read operation is received for a logical volume, the volume table corresponding to the logical volume is examined to determine the provision where the requested data is stored.

Figure 7:
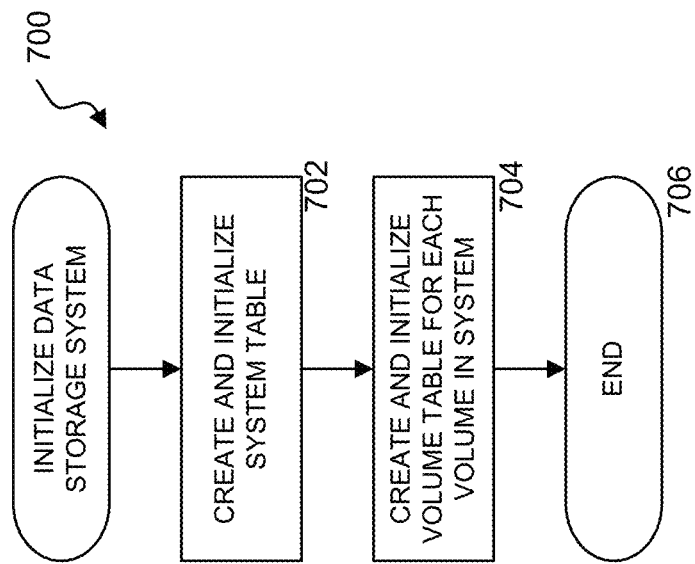
FIG. 7 illustrates example initialization operations for the various embodiments described herein.

Referring now to FIG. 7, additional details regarding the operation of the computer 2 for provisioning available data storage capacity as needed will be provided. In particular, a routine 700 will be described illustrating initialization operations performed by the computer 2. It should be appreciated that the logical operations of the various embodiments of the disclosure are implemented (1) as a sequence of computer implemented acts or program modules running on a computing system and/or (2) as interconnected machine logic circuits or circuit modules within the computing system. The routine 700 begins at operation 702, where the system table 64 is created and initialized. As described above, the system table 64 is stored in the RAM 18 of the computer 2. Moreover, as also described above, the system table 64 may be stored entirely in the RAM 18 or may be allocated territory-by-territory in the manner described above. Once the system table has been created and initialized, the routine 700 continues from operation 702 to operation 704.

At operation 704, a volume table 80 is created and initialized for each logical storage volume defined within the computer 2. Because no space has yet been allocated, each entry in the volume table is set to null. The logical volumes may each be defined by a user or administrator and may each have a reserved amount of available physical storage space corresponding to the computer 2. In some implementations the amount of reserved space for each volume may be fixed. The amount of physical storage space reserved for each of the logical volumes may be defined in the volume data 73 of the system table. Moreover, each volume table may have a corresponding number of entries that is proportional to its size. Once the volume tables have been created and initialized, the computer 2 is ready to receive and respond to read and write requests. From the operation 704, the routine 700 continues to operation 706, where it ends.

In some implementations, the amount of total physical storage space reserved for the logical volumes may not exceed the total available physical storage space available for the computer 2. If the amount of physical storage space reserved for the logical volumes exceeds the available storage space an error may be issued to a user or administrator. The administrator may then adjust the amount of physical storage space reserved for each volume, or may add more physical storage space to the computer 2.

Figure 8:
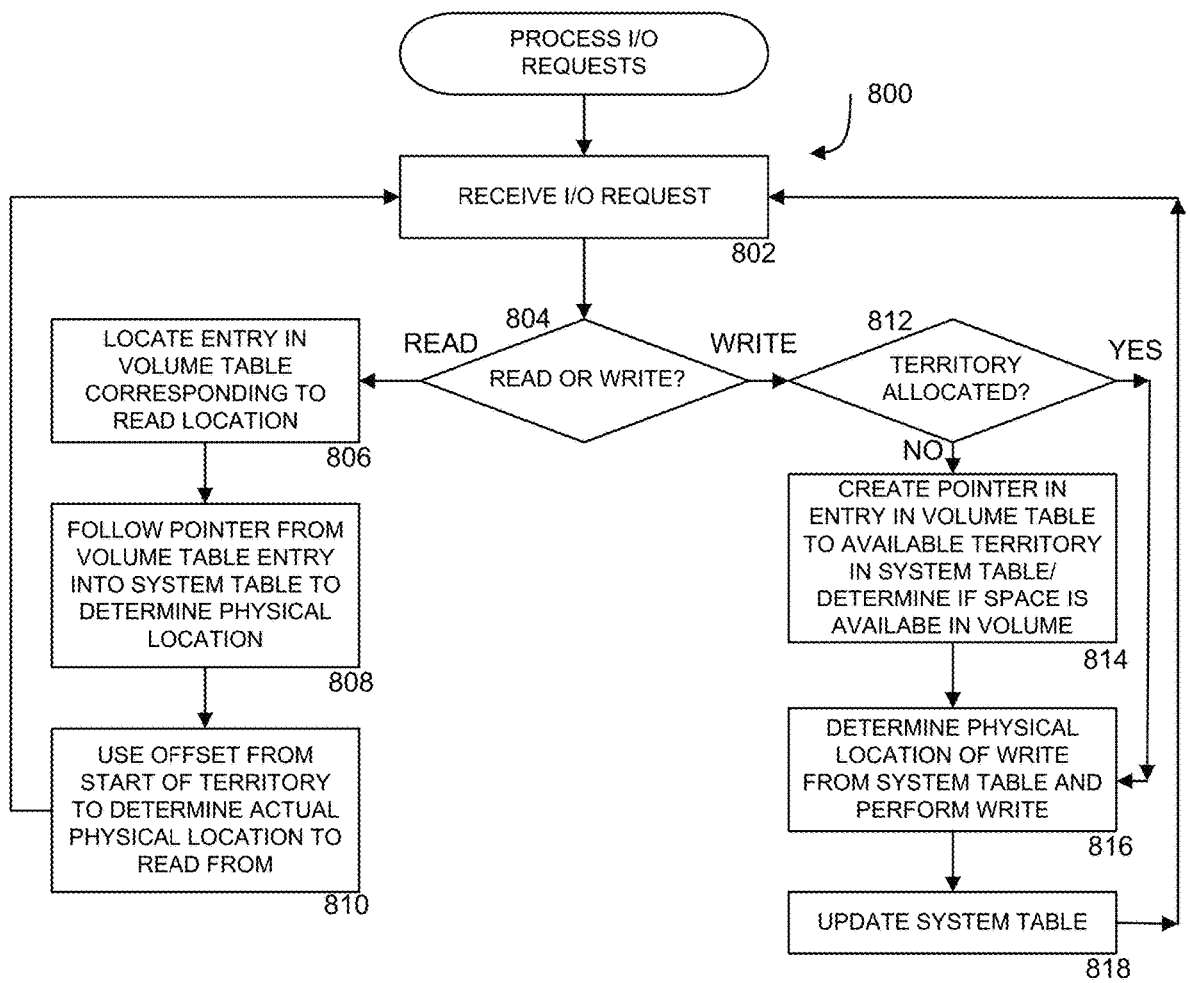
FIG. 8 illustrates example operations for processing read and write operations directed to the storage system when entries in the volume tables include pointers to territories in the system table.

Referring now to FIG. 8, an illustrative routine 800 will be described for processing read and write operations directed to the computer 2 in implementations where the entries in the volume tables include pointers to territories in the system table 64. In particular, the routine 800 begins at operation 802, where an input/output request is received. The routine 800 then continues to operation 804, where a determination is made as to whether the request is a read operation request or a write operation request. If the request is for performing a read operation, the routine 800 branches from operation 804 to operation 806.

At operation 806, the entry in the appropriate volume table is located that corresponds to the territory to be read from. If the entry is null, the territory has not yet been allocated to the volume, so an error may be returned in response to the read request. Otherwise, the routine 800 continues to operation 808, where the pointer contained in the located entry is followed into the system table 64. From the pointed to location within the system table 64, the physical location of the territory allocated to the territory can be determined. The routine 800 then continues to operation 810, where the offset from the start of the logical territory to the block to be read is utilized to determine the actual location to be read within the located physical territory. Once this has been performed, the requested block is read from the physical device and the read data is returned in response to the original read request. From operation 810, the routine 800 returns to operation 802, where another read/write request may be processed in a similar manner.

If, at operation 804, it is determined that the request is for performing a write operation, the routine 800 branches to operation 812. At operation 812, a determination is made as to whether physical space has been allocated to the logical territory in which the data is to be written. This may be accomplished, for instance, by examining the appropriate entry in the volume table. If the entry contains a valid pointer, then space has been allocated and the routine 800 branches from operation 812 to operation 816. If the entry contains a null pointer or other value, then space has not been allocated and the routine 800 continues from operation 812 to operation 814.

At operation 814, a valid pointer is created in the entry in the volume table corresponding to the logical volume to be written. This valid pointer points to an entry in the system table available for allocation, e.g., an entry in the system table corresponding to a territory available for allocation.

Additionally, the physical storage space available for this allocation is located in a storage device assigned to the highest available tier.

In addition, some implementations, before the valid pointer is created in the entry in the volume table, a determination may be made as to whether there is remaining space reserved for the logical volume. As described above, a user or administrator may reserve an amount of physical storage space for each logical volume. Whether there is remaining space in the physical volume to allocate to the logical volume may be determined based on the entry in the volume data 73 of the system table corresponding to the logical volume. If no space remains, an error may be generated. Else, the physical space may be allocated and the entry in the volume data 73 of the system table 64 indicating the amount of space allocated to the logical volume so far may be incremented.

The routine 800 then continues to operation 816, where the actual location of the data to be written within the allocated territory is located and the write operation is performed. As described herein, the actual location is in a storage device assigned to the highest available tier. From operation 816, the routine 800 then continues to operation 818, where the contents of the system table 64 are updated to reflect the write operation. The routine 800 then returns from operation 818 to operation 802, described above.

Figure 9:
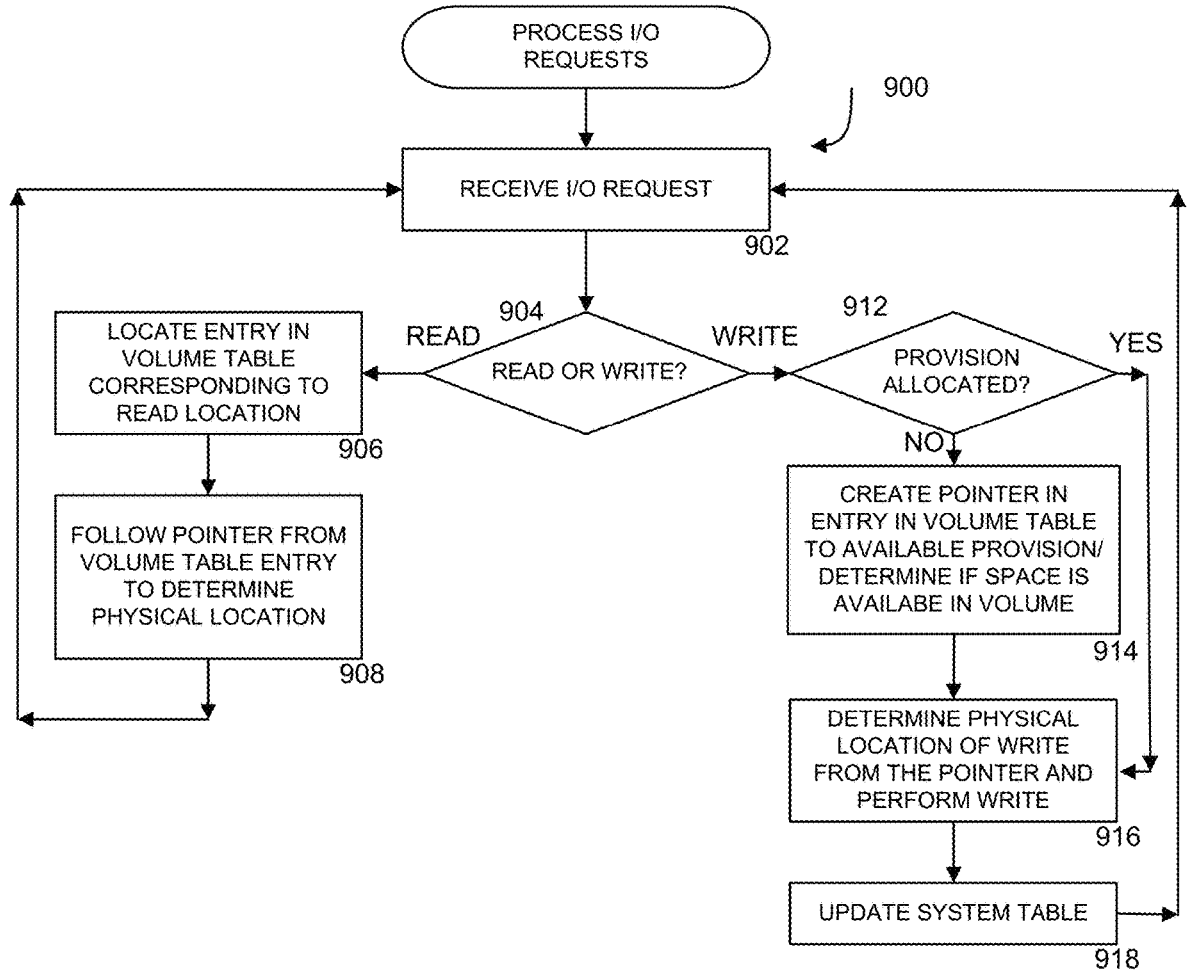
FIG. 9 illustrates example operations for processing read and write operations directed to the storage system when entries in the volume tables include pointers to provisions of the physical storage.

Referring now to FIG. 9, an illustrative routine 900 will be described for processing read and write operations directed to the computer 2 in implementations where the entries in the volume tables include pointers to provisions of the physical storage. In particular, the routine 900 begins at operation 902, where an input/output request is received. The routine 900 then continues to operation 904, where a determination is made as to whether the request is a read operation request or a write operation request. If the request is for performing a read operation, the routine 900 branches from operation 904 to operation 906.

At operation 906, the entry in the appropriate volume table is located that corresponds to the provision to be read from. If the entry is null, the provision has not yet been allocated to the volume associated with the read operation, so an error may be returned in response to the read request. Otherwise, the routine 900 continues to operation 908, where the pointer contained in the located entry of the volume table is followed to the block location of the physical storage device corresponding to the read operation. Once this has been performed, the requested block is read from the physical device and the read data is returned in response to the original read request. From operation 908, the routine 900 returns to operation 902, where another read/write request may be processed in a similar manner.

If, at operation 904, it is determined that the request is for performing a write operation, the routine 900 branches to operation 912. At operation 912, a determination is made as to whether physical space has been allocated to the provision in which the data is to be written. This may be accomplished, for instance, by examining the appropriate entry in the volume table. If the entry contains a valid pointer, then space has been allocated and the routine 900 branches from operation 912 to operation 916. If the entry contains a null pointer or other value, then space has not been allocated and the routine 900 continues from operation 912 to operation 914.

At operation 914, a valid pointer is created in the entry in the volume table corresponding to the logical volume to be written. This valid pointer points directly to physical storage space available for allocation, e.g., a provision of physical storage space available for allocation. Additionally, the physical storage space available for this allocation is located in a storage device assigned to the highest available tier.

In addition, some implementations, before the valid pointer is created in the entry in the volume table, a determination may be made as to whether there is remaining space reserved for the logical volume. As described above, a user or administrator may reserve an amount of physical storage space for each logical volume. Whether there is remaining space in the physical volume to allocate to the logical volume may be determined based on the entry in the volume data 73 of the system table corresponding to the logical volume. If no space remains, an error may be generated. Else, the physical space may be allocated and the entry in the volume data 73 of the system table 64 indicating the amount of space allocated to the logical volume so far may be incremented.

The routine 900 then continues to operation 916, where the write operation is performed at the allocated provision. As described herein, the actual location is in a storage device assigned to the highest available tier. From operation 916, the routine 900 then continues to operation 1018, where the contents of the system table 64 may be updated to reflect the write operation. The routine 900 then returns from operation 918 to operation 902, described above.

As described above, the storage system is a tiered storage system having a plurality of mass storage devices (e.g., storage devices, storage drives, drives, etc.), where the storage devices are assigned to one of a plurality of hierarchal tiers based, at least in part, on the type of drive and/or various performance characteristics of the drive. According to conventional fat provisioning, storage space is allocated when a logical volume is created, which results in random I/O being scattered across the logical volume. For example, in a tiered storage system, physical storage space would be allocated to the logical volume from a plurality of tiers (e.g., portions of SSDs, SAS drives, and/or SATA drives) according to fat provisioning. The logical volume would therefore include physical storage space in higher and lower performance drives, and when data is written to this logical volume from the initiators (e.g., initiators 8A-8D shown in FIG. 1) or application, the data would be spread across drives assigned to different tiers. This results in a number of disadvantages including, but not limited to, longer seek times, degradation of storage system performance, and underutilization of the high cost tier (e.g., new writes fall directly into the lower tiers while the higher tiers still have unused physical storage space).

In contrast to conventional fat provisioning, where physical storage space is allocated beforehand, this disclosure describes a technique where a logical volume is created by reserving, but not yet allocating, a portion of the storage capacity of the tiered storage system for the logical volume. At a later time, and in response to write I/O operation(s), physical storage space is allocated to the logical volume. Optionally, in some implementations, the allocated physical storage space can be located in a storage device assigned to the highest available tier. In other words, physical storage space can be allocated to the logical volume on demand in response to write I/O operations. As a result, data can be written sequentially to the storage device assigned to the highest available tier as the allocation happens on demand. Accordingly, the write I/O operations fall into the higher cost tiers first, thereby giving higher performance to the end application or user. Additionally, data is filled in sequentially such that the highest tier is used for data storage before lower tiers. Thus, even if data movement is enabled (e.g., using information lifecycle management ("ILM") statistics), the highest tier is filled first, which lengthens the period of time before demotion of data to lower tiers even begins. This ensures that new data, which is currently frequently used and/or frequency accessed, always lies in the highest tier, which offers better performance and utilization of the highest tier.

Additionally, the technique described herein avoids a considerable amount of data movement among tiers, which would happen if new write I/O operations land in the lower tiers of the tiered storage system. For example, if a write I/O operation were to land in a lower tier, the data associated with the write I/O operation would be new or frequently accessed data, and this data would then be promoted to a higher tier. For the promotion to happen, demotion of allocated unused data from the higher tier to the lower tier would also have to happen. These data migration operations unnecessarily use valuable disk and CPU bandwidth, which could instead be used to service the application or initiators. In contrast, using the techniques described herein, newly written data can always falls into the highest tier, thereby eliminating the need to promote data to the higher tier. Only data demotion may happen (e.g., for less frequency used and/or less frequently accessed data).

Moreover, according to the technique described herein, since new data is placed in the highest tier, seek times are drastically reduced as compared to the scenario where data would have been placed in lower tiers. This disclosure contemplates that lower tiers would be present across enclosures of the storage system, which involves more cabling and limited by the bandwidth of the cabling and the underlying low speed or larger capacity disks.

Alternatively or additionally, the technique described herein can allow a system administrator to assign logical volumes to logical volume priority categories. The volume priority categories allow the administrator to manage data distribution across storage devices in the different tiers. As described herein the tiered storage system can include a plurality of storage devices, which can include, but are not limited to, NVMe SSDs, SSDs, SAS drives, NL SAS drives, and SATA drives. In a tiered storage system, the storage devices are assigned to tiers (e.g., top, middle, bottom tiers) based on the drive types and/or drive performance characteristics. The administrator can also optionally define a plurality of volume priority categories, where each volume priority category is associated with a respective data distribution across the tiered storage system. For example, in some implementations, the tiered storage system can include SSDs (e.g., assigned to top tier), SAS drives (e.g., assigned to middle tier), and NL SAS drives (e.g., assigned to bottom tier). It should be understood that these drive types and tier assignments are provided only as examples. The administrator can optionally define high, medium, and low volume priority categories. As described herein, the administrator can assign logical volume priority at the time of volume creation. Optionally, the administrator can update volume priority at any time after volume creations, which results in redistribution of the volume data.

Each volume priority category is associated with a respective data distribution across tiered storage system. For example, a greater percentage of data can be stored in higher tiers for high volume priority volumes, while a greater percentage of data can be stored in lower tiers for low volume priority volumes. In this example, the data distribution for a high priority volume may be X % in SSDs (top tier), Y % in SAS drives (middle tier), and Z % in NL SAS (bottom tier), where X>Y>Z and where X+Y+Z=100%. In this way, the majority of the data is stored in the highest tiers. Additionally, the data distribution for a medium priority volume may be X' % in SSDs (top tier), Y' % in SAS drives (middle tier), and Z' % in NL SAS (bottom tier), where Y'>Z'>X' and where X'+Y'+Z'=100%. Additionally, the data distribution for a low priority volume may be X" % in SSDs (top tier), Y" % in SAS drives (middle tier), and Z" % in NL SAS (bottom tier), where Z">Y ">X" and where X"+Y"+Z"=100%. In this way, the majority of the data is stored in the lowest tiers.

Figure 10:
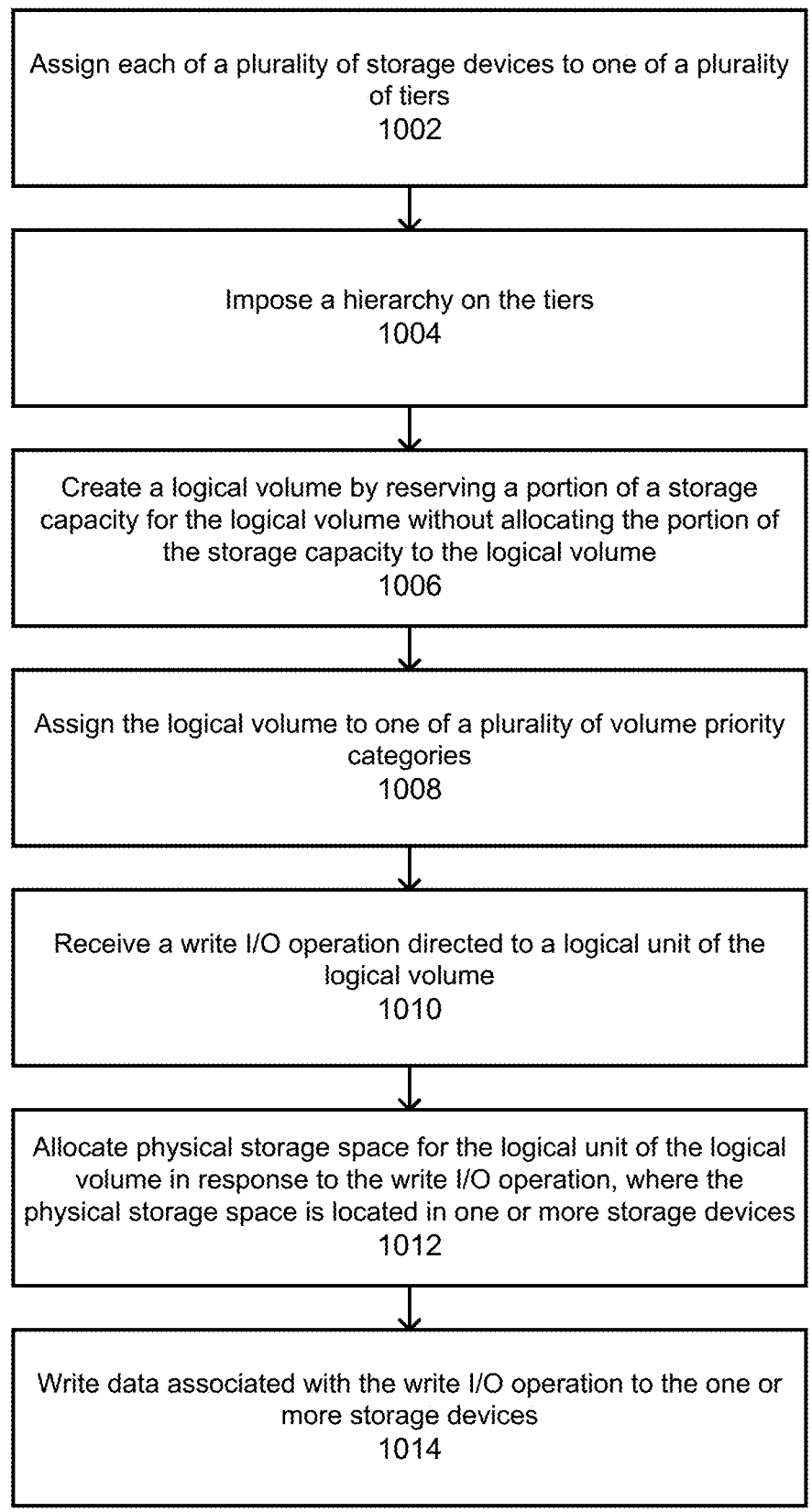
FIG. 10 illustrates example operations for handling I/O operations in a tiered storage system according to an implementation described herein.

Referring now to FIG. 10, example operations for handling I/O operations in a tiered storage system are shown. As described above, the tiered storage system includes a plurality of storage devices, each of which is assigned to one of a plurality of hierarchal tiers. The storage devices can include, but are not limited to, NVMe SSDs, SSDs, SAS drives, NL SAS drives, and SATA drives. This disclosure contemplates that the operations can be implemented using a storage server computer (e.g., storage server computer 2 shown in FIGS. 1 and 2).

At step 1002, each of a plurality of storage devices are assigned to one of a plurality of tiers. At step 1004, a hierarchy is imposed on the tiers. As described above, the hierarchy can be imposed on the tiers based, at least in part, on the types of drives and/or different performance characteristics of the drives. In one example, the tiered storage system includes three tiers, where the top tier (e.g., high-performance tier) includes one or more SSDs, the middle tier includes one or more SAS drives, and the bottom tier (e.g., low-performance tier) includes one or more NL SAS drives.

At step 1006, a logical volume is created by reserving a portion of a storage capacity of the tiered storage system for the logical volume without allocating the portion of the storage capacity of the tiered storage system to the logical volume. In other words, storage capacity for the logical volume is reserved, but not yet allocated, at the time of volume creation. Then, on demand and/or in response to write I/O operations, storage capacity is allocated to the logical volume as described herein. Example operations for reserving, but not yet allocating, physical storage for the logical volume are described herein with regard to FIGS. 4-9. These operations can include creation, use, and/or maintenance of a system table (e.g., system table 64 shown in FIGS. 5 and 6) and a volume table (e.g., volume table 80A or 80B shown in FIG. 6). For example, a system table including a plurality of entries can be created. Each of the entries in the system table can be mapped to a unique portion of the storage capacity of the tiered storage system. The system table and its entries can be examined to determine whether reserved storage capacity for the logical volume remains unallocated. Additionally, a volume table for the logical volume can be created. In some implementations, each of the entries in the volume table can either contain a pointer to an entry in the system table, e.g., as described with respect to operation 814 of FIG. 8, or a null value. In other implementations, each of the entries in the volume table can contain a pointer directly to physical storage space, e.g., as described with respect to operation 914 of FIG. 9, or a null value. If the entry contains a pointer to an entry in the system table (or directly to physical storage), the logical unit has been allocated. On the other hand, if the entry contains a null pointer, the logical unit remains unallocated. Thus, the volume table and its entries can be examined to whether the logical unit of the logical volume has been allocated.

At step 1008, the logical volume can be assigned to one of a plurality of volume priority categories. In one example, there can be three volume priority categories, e.g., high, medium, and low priority. Each volume priority category is associated with a respective data distribution across the tiered storage system as described above. At step 1010, a write I/O operation directed to a logical unit of the logical volume is received. In some implementations, the write I/O operation is a random I/O operation. At step 1012, physical storage space for the logical unit of the logical volume is then allocated in response to the write I/O operation. As described herein, the system and volume tables and their respective entries can be examined to determine whether reserved storage capacity remains unallocated (i.e., check system table) and also determine whether a logical unit has been allocated (i.e., check volume table). Because storage capacity is reserved beforehand and then allocated to the logical volume on demand, the allocated physical storage space can be located in a storage device assigned to a highest available tier. Then, at step 1014, data associated with the write I/O operation is written to one or more storage devices. Optionally, the write I/O operation is written to assigned to the highest available tier. When data is written to the highest available tier, it is possible to sequentially write data associated with a plurality of write I/O operations to the storage device assigned to the highest available tier. This is even possible in response to a plurality of random write I/O operations. In other words, the data associated with the random I/O operations can be sequentially written to a storage device assigned to the highest available tier.

Optionally, if data movement is enabled, data can be migrated between a storage device assigned to a relatively higher tier and a storage device assigned to a lower tier. For example, data can optionally be migrated based on a frequency of data access or a time of last data access. In some implementations, this information can be obtained from information lifecycle management ("ILM") statistics. It should be understood that ILM statistics are only one example technique for obtain such time/frequency of access information. It should be understood that data can be promoted from a lower tier to a higher tier or data can be demoted from a higher tier to a lower tier. This disclosure contemplates that data migration can be performed as a background operation to minimize the impact on storage system performance. In some implementations, for example, when data is written to the highest available tier, data promotion operations can be avoided or minimized since newly written data lands in the higher tiers.

Alternatively or additionally, data migration based on ILM statistics can consult tier ordering, volume priority categories, data migration (e.g., promotion and/or demotion) policies, or combinations thereof. In some implementations, data promotion can be determined by consultation in the following order: tier ordering→promotion policies→volume priority categories. For example, the data storage system can have a plurality of tiers such as top tier (X), middle tier (Y), bottom tier (Z) and a plurality of volume priority categories such as high, medium, low. It should be understood that the number of tiers and/or volume priority categories are provided only as examples. An example allocation strategy for a medium profile volume in the data storage system can be middle tier (Y), bottom tier (Z), and then top tier (X). And, an example promotion policy for the middle tier (Y) can be any territory with an access frequency more than a predetermined number of accesses (e.g., 100) in a period of time (e.g., the last hour) is moved to top tier (X). In this example, however, data movement between middle tier (Y) and top tier (X) is ignored based on the volume priority category (medium profile volume), since as per the rule, the data is already located in the highest desirable tier (middle tier (Y)). In some implementations, data demotion can consult tier ordering, demotion policies, or combinations thereof. Demotion can stop at the bottom tier (Z) such that data would not be moved to top tier (X) as this would be counterproductive. In other words, unlike data promotion, volume priority categories are not consulted for data demotion.

Optionally, in some implementations, the method can further include reassigning the logical volume to a different one of the volume priority categories. Alternatively or additionally, the method can further include updating the respective data distribution for one or more of the volume priority categories. It should be understood that either of these operations will result in data migration.

The techniques described herein offer one or more of the following advantages over conventional operations:

Better management of data distribution across the tiered storage system;

better performance due to new data always landing in the highest tier;

better performance due to frequently accessed and/or frequently used data always being placed in the higher tier;

avoid under utilization of the higher tiers as the higher tiers always have free space to service the new I/O operations;

avoid unnecessary data movements among tiers which would consume disk and CPU bandwidth;

avoid unnecessary pointer based data movements among tiers which would consume CPU bandwidth; and/or eliminate the seek time of data being spread across tiers as frequently accessed data or new data is always placed in the higher tiers.

It will be appreciated that embodiments of the present invention provide a method, apparatus, system, and computer-readable medium for handling write I/O operations in a tiered storage system. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention. Moreover, it should be appreciated that, according to the embodiments of the invention, the software described herein has been implemented as a software program executing on a server computer. Alternatively, however, the software operations described herein may be performed by a dedicated hardware circuit, by program code executing on a general-purpose or specific-purpose microprocessor, or through some other combination of hardware and software.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for handling input/output ("I/O") operations in a tiered storage system, comprising:

assigning each of a plurality of storage devices to one of a plurality of tiers;

imposing a hierarchy on the tiers;

creating a logical volume by reserving a portion of a storage capacity of the tiered storage system for the logical volume without allocating the portion of the storage capacity of the tiered storage system to the logical volume;

assigning the logical volume to one of a plurality of volume priority categories;

receiving a write I/O operation directed to a logical unit of the logical volume;

allocating physical storage space for the logical unit of the logical volume in response to the write I/O operation, wherein the physical storage space is located in one or more of the plurality of storage devices;

writing data associated with the write I/O operation to the one or more of the plurality of storage devices;

migrating data in the logical volume between a storage device assigned to a relatively higher tier and a storage device assigned to a relatively lower tier based, at least in part, on a volume priority category, wherein the relatively higher tier has performance that is higher than the relatively lower tier, and wherein demotion of first data, from the relatively higher tier to the relatively lower tier, does not consult the volume priority category; and specifying, by a data migration policy, that second data meets criteria for promotion to the relatively higher tier, wherein based on the volume priority category, the second data is prevented from promoting to the relatively higher tier.

2. The computer-implemented method of claim 1, further comprising defining the plurality of volume priority categories, wherein each respective volume priority category is associated with a respective data distribution across the tiered storage system.

3. The computer-implemented method of claim 1, further comprising sequentially writing data associated with a plurality of write I/O operations to the one or more of the plurality of storage devices.

4. The computer-implemented method of claim 3, further comprising allocating second physical storage space for a plurality of logical units of the logical volume in response to the plurality of write I/O operations, wherein the second physical storage space is located in the one or more of the plurality of storage devices.

5. The computer-implemented method of claim 1, further comprising: creating a system table including a plurality of entries, wherein each of the entries in the system table is mapped to a unique portion of the storage capacity of the tiered storage system; and creating a volume table for the logical volume, the volume table including a plurality of entries, wherein each of the entries in the volume table contains a pointer to an entry in the system table, a pointer directly to a location in physical storage, or a null value.

6. The computer-implemented method of claim 5, further comprising examining the volume table to determine whether the logical unit of the logical volume has been allocated.

7. The computer-implemented method of claim 6, further comprising examining the system table to determine whether reserved storage capacity for the logical volume remains unallocated.

8. The computer-implemented method of claim 1, wherein the plurality of storage devices comprise at least one solid-state drive ("SSD"), serial attached small computer system interface ("SAS") drive, or serial AT attachment ("SATA") drive, wherein the hierarchy is imposed on the tiers based, at least in part, on type of the plurality of storage devices.

9. The computer-implemented method of claim 1, wherein one or more of the plurality of storage devices have different performance characteristics, wherein the hierarchy is imposed on the tiers based, at least in part, on the different performance characteristics.

10. The computer-implemented method of claim 1, wherein the data in the logical volume is migrated between the storage device assigned to the relatively higher tier and the storage device assigned to the relatively lower tier based, at least in part, on the volume priority category, a tier ordering, and the data migration policy.

11. The computer-implemented method of claim 10, wherein the data in the logical volume is migrated between the storage device assigned to the relatively higher tier and the storage device assigned to the relatively lower tier by consultation in order of the tier ordering, the data migration policy, and the volume priority category.

12. A non-transitory computer-readable recording medium having computer-executable instructions stored thereon that, when executed by a computer in a tiered storage system, cause the computer to:

assign each of a plurality of storage devices to one of a plurality of tiers;

impose a hierarchy on the tiers;

create a logical volume by reserving a portion of a storage capacity of the tiered storage system for the logical volume without allocating the portion of the storage capacity of the tiered storage system to the logical volume;

assign the logical volume to one of a plurality of volume priority categories;

receive a write input/output ("I/O") operation directed to a logical unit of the logical volume;

allocate physical storage space for the logical unit of the logical volume in response to the write I/O operation, wherein the physical storage space is located in one or more of the plurality of storage devices;

write data associated with the write I/O operation to the one or more of the plurality of storage devices;

migrate data in the logical volume between a storage device assigned to a relatively higher tier and a storage device assigned to a relatively lower tier based, at least in part, on a volume priority category, wherein the relatively higher tier has performance that is higher than the relatively lower tier, and wherein demotion of first data, from the relatively higher tier to the relatively lower tier, does not consult the volume priority category: and specifying, by a data migration policy, that second data meets criteria for promotion to the relatively higher tier, wherein based on the volume priority category, the second data is prevented from promoting to the relatively higher tier.

13. The non-transitory computer-readable recording medium of claim 11, having further computer-executable instructions stored thereon that, when executed by the computer in the tiered storage system, cause the computer to define the plurality of volume priority categories, wherein each respective volume priority category is associated with a respective data distribution across the tiered storage system.

14. The non-transitory computer-readable recording medium of claim 12, having further computer-executable instructions stored thereon that, when executed by the computer in the tiered storage system, cause the computer to sequentially write data associated with a plurality of write I/O operations to the one or more of the plurality of storage devices.

15. The non-transitory computer-readable recording medium of claim 12, having further computer-executable instructions stored thereon that, when executed by the computer in the tiered storage system, cause the computer to allocate second physical storage space for a plurality of logical units of the logical volume in response to the plurality of write I/O operations, wherein the second physical storage space is located in the one or more of the plurality of storage devices.

16. The non-transitory computer-readable recording medium of claim 12, wherein the plurality of storage devices comprise at least one solid-state drive ("SSD"), serial attached small computer system interface ("SAS") drive, or serial AT attachment ("SATA") drive, wherein the hierarchy is imposed on the tiers based, at least in part, on type of the plurality of storage devices.

17. The non-transitory computer-readable recording medium of claim 12, wherein one or more of the plurality of storage devices have different performance characteristics, wherein the hierarchy is imposed on the tiers based, at least in part, on the different performance characteristics.

18. A storage system computer for handling input/output ("I/O") operations in a tiered storage system, comprising:
   a processor; and
   a memory operably connected to the processor, the memory having computer-executable instructions stored thereon that, when executed by the processor, cause the processor to:
      assign each of a plurality of storage devices to one of a plurality of tiers;
      impose a hierarchy on the tiers;
      create a logical volume by reserving a portion of a storage capacity of the tiered storage system for the logical volume without allocating the portion of the storage capacity of the tiered storage system to the logical volume;
      assign the logical volume to one of a plurality of volume priority categories;
      receive a write I/O operation directed to a logical unit of the logical volume;
      allocate physical storage space for the logical unit of the logical volume in response to the write I/O operation, wherein the physical storage space is located in one or more of the plurality of storage devices;
      write data associated with the write I/O operation to the one or more of the plurality of storage devices;
      migrate data in the logical volume between a storage device assigned to a relatively higher tier and a storage device assigned to a relatively lower tier based, at least in part, on a volume priority category, wherein the relatively higher tier has performance that is higher than the relatively lower tier, and wherein demotion of first data, from the relatively higher tier to the relatively lower tier, does not consult the volume priority category; and
      specify, by a data migration policy, that second data meets criteria for promotion to the relatively higher tier, wherein based on the volume priority category, the second data is prevented from promoting to the relatively higher tier.

19. The storage system computer of claim 18, wherein the memory has further computer-executable instructions stored thereon that, when executed by the processor, cause the processor to define the plurality of volume priority categories, wherein each respective volume priority category is associated with a respective data distribution across the tiered storage system.

20. The storage system computer of claim 18, wherein the plurality of storage devices comprise at least one solid-state drive ("SSD"), serial attached small computer system interface ("SAS") drive, or serial AT attachment ("SATA") drive.

* * * * *